United States Patent
Witczak et al.

(10) Patent No.: US 10,268,166 B2
(45) Date of Patent: Apr. 23, 2019

(54) INTELLIGENT SURFACE SYSTEMS FOR BUILDING SOLUTIONS

(71) Applicant: Otis Elevator Company, Farmington, CT (US)

(72) Inventors: Tadeusz Pawel Witczak, Bethel, CT (US); Marcin Piech, East Hampton, CT (US); Zbigniew Piech, Cheshire, CT (US); Daryl J. Marvin, Farmington, CT (US); Stella M. Oggianu, West Hartford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 238 days.

(21) Appl. No.: 15/265,926

(22) Filed: Sep. 15, 2016

(65) Prior Publication Data
US 2018/0074466 A1    Mar. 15, 2018

(51) Int. Cl.
| G05B 13/00 | (2006.01) |
| G05B 11/01 | (2006.01) |
| G05B 15/02 | (2006.01) |
| B66B 1/46  | (2006.01) |

(52) U.S. Cl.
CPC .............. *G05B 11/01* (2013.01); *B66B 1/468* (2013.01); *G05B 15/02* (2013.01); *B66B 2201/4669* (2013.01)

(58) Field of Classification Search
CPC .... B66B 1/18; B66B 1/32; B66B 1/36; B66B 1/468; B66B 1/2458; B66B 1/00; B66B 9/00; B66B 21/00; G05B 11/01; G05B 15/02
See application file for complete search history.

(56) References Cited

U.S. PATENT DOCUMENTS

| 844,280 A | 2/1907 | Grove |
| 2,902,117 A | 9/1959 | Pierson |
| 3,543,883 A | 12/1970 | Kuzara |
| 4,795,998 A | 1/1989 | Dunbar et al. |
| 4,888,581 A | 12/1989 | Guscott |
| 4,989,694 A * | 2/1991 | Ueshima ............... B66B 1/2458 187/380 |
| 5,010,472 A * | 4/1991 | Yoneda ..................... B66B 1/18 187/391 |

(Continued)

FOREIGN PATENT DOCUMENTS

| CN | 201777767 U | 3/2011 |
| CN | 102054304 A | 5/2011 |

(Continued)

OTHER PUBLICATIONS

Search Report dated Feb. 23, 2018 in U320728EP, EP Application No. EP17190987, 7 pages.

*Primary Examiner* — Tuan A Vu
(74) *Attorney, Agent, or Firm* — Cantor Colburn LLP (57) ABSTRACT

An intelligent surface system is provided for deployment in a space. The intelligent surface system includes a personnel movement device (PMD) configured to move an individual between first and second locations, sensors deployed to sense characteristics of the individual and a controller configured to determine a condition of the individual based on the characteristics and control an operation of the PMD in accordance with the determined condition of the individual.

18 Claims, 4 Drawing Sheets

(56) References Cited

U.S. PATENT DOCUMENTS

| | | |
|---|---|---|
| 5,656,801 A | 8/1997 | Goren et al. |
| 6,357,554 B1 | 3/2002 | Valk et al. |
| 6,515,586 B1 | 2/2003 | Wymore |
| 6,603,082 B1 | 8/2003 | Delbrueck et al. |
| 6,707,386 B1 | 3/2004 | Pruisner |
| 6,909,373 B2 | 6/2005 | Power et al. |
| 7,382,267 B2 | 6/2008 | Brendley et al. |
| 7,504,938 B2 | 3/2009 | Eiza |
| 7,847,688 B2 | 12/2010 | Bernard et al. |
| 8,138,882 B2 | 3/2012 | Do et al. |
| 8,284,071 B2 | 10/2012 | Peng et al. |
| 8,643,379 B2 | 2/2014 | Virtanen et al. |
| 9,079,751 B2 | 7/2015 | Sundholm et al. |
| 2007/0171058 A1 | 7/2007 | Knowles et al. |
| 2008/0116017 A1 | 5/2008 | Kress |
| 2008/0218338 A1 | 9/2008 | Schoettle |
| 2012/0168262 A1 | 7/2012 | Finschi |
| 2013/0105248 A1* | 5/2013 | Martinelli ................. B66B 1/32 187/288 |
| 2014/0006034 A1* | 1/2014 | Takeuchi ................ B66B 1/468 704/275 |
| 2014/0215928 A1 | 8/2014 | Desgorces et al. |
| 2015/0054649 A1 | 2/2015 | Desgorces |
| 2016/0031675 A1* | 2/2016 | Silvennoinen .......... B66B 1/468 187/247 |
| 2017/0174472 A1* | 6/2017 | Lotfi ........................ B66B 1/36 |

FOREIGN PATENT DOCUMENTS

| | | |
|---|---|---|
| CN | 203419647 U | 2/2014 |
| CN | 105712170 A | 6/2016 |
| DE | 4404886 A | 8/1995 |
| DE | 102004057000 B3 | 6/2006 |
| EP | 0992949 A2 | 4/2000 |
| EP | 1308905 A1 | 5/2003 |
| EP | 1337975 A1 | 8/2003 |
| FR | 2793580 A1 | 11/2000 |
| JP | H07187536 A | 7/1995 |
| JP | 2013151361 A | 8/2013 |
| WO | 9702474 A1 | 1/1997 |
| WO | 9840719 A1 | 9/1998 |
| WO | 0075417 A1 | 12/2000 |
| WO | 16083294 A1 | 6/2016 |

* cited by examiner

INTELLIGENT SURFACE SYSTEMS FOR BUILDING SOLUTIONS

BACKGROUND OF THE DISCLOSURE

The subject matter disclosed herein relates to intelligent surface systems and, more particularly, to intelligent surface systems for buildings.

Modern building systems rely on user interaction and pre-determined operating parameters for proper function. For example, users consciously provide inputs for destination entries to elevators and elevator cabs are pre-programmed to operate under the same operating conditions regardless of any other information that can be gleaned from the users when they input their destinations. That is, elevators and escalators or other personnel movement systems usually lack an ability to autonomously diagnose user intent and special circumstances (e.g., number of users, their mood, special accessibility requirements & disabilities, etc.) that could be used to otherwise enhance user experience (UX) and to increase operating system efficiency and performance.

BRIEF DESCRIPTION OF THE DISCLOSURE

According to one aspect of the disclosure, an intelligent surface system is provided for deployment in a space. The intelligent surface system includes a personnel movement device (PMD) configured to move an individual between first and second locations, sensors deployed to sense characteristics of the individual and a controller configured to determine a condition of the individual based on the characteristics and control an operation of the PMD in accordance with the determined condition of the individual.

According to additional or alternative embodiments, the PMD includes at least one of an elevator, an escalator and a moving walkway and a human machine interface (HMI) configured to control the at least one of the elevator, the escalator and the moving walkway.

According to additional or alternative embodiments, the sensors include at least one or more of mats and at least one or more touch sensitive sensors.

According to additional or alternative embodiments, the mats are deployed proximate to a PMD, across a walkway or as an island in a walkway and the touch sensitive sensors are integrated into control panels, handrails, handles and door panels.

According to additional or alternative embodiments, the characteristics include at least one or more of object tracking characteristics, object detection characteristics and object property determination characteristics.

According to additional or alternative embodiments, the controller determines at least one or more of a location, a speed, a direction and an intent from the object tracking characteristics, a type of an object from the object detection characteristics and a mass, a volume and a type of motion from the object property determination characteristics.

According to additional or alternative embodiments, the controller is configured to expedite or disable the PMD in accordance with the determined condition of the individual.

According to additional or alternative embodiments, the controller is configured to pre-torque the PMD in accordance with the determined condition of the individual.

According to additional or alternative embodiments, the controller is configured to modulate an operation of the PMD in accordance with the determined condition of the individual.

According to another aspect of the disclosure, an intelligent surface system is provided and includes an enclosure, personnel movement devices (PMD) configured to move individuals between respective first and second locations within the enclosure, sensors deployed within the enclosure to sense characteristics of the individuals and a controller coupled to the PMD and the sensors. The controller is configured to determine a condition of each of the individuals based on the characteristics and control respective operations of the PMDs in accordance with the determined conditions of each of the individuals.

According to additional or alternative embodiments, the PMDs include at least one or more elevators, at least one or more escalators, at least one or more moving walkways and human machine interfaces (HMI) for each of the at least one or more elevators, the escalators and the moving walkways, each HMI being configured to control the corresponding elevator, escalator or moving walkways.

According to additional or alternative embodiments, the sensors include at least one or more of mats and at least one or more touch sensitive sensors.

According to additional or alternative embodiments, the mats are deployed within the enclosure proximate to a PMD, across a walkway or as an island in a walkway and the touch sensitive sensors are integrated into control panels, handrails, handles and door panels.

According to additional or alternative embodiments, the characteristics include at least one or more of object tracking characteristics, object detection characteristics and object property determination characteristics.

According to additional or alternative embodiments, the controller determines at least one or more of a location, a speed, a direction and an intent from the object tracking characteristics, a type of an object from the object detection characteristics and a mass, a volume and a type of motion from the object property determination characteristics.

According to additional or alternative embodiments, the controller is configured to expedite or disable the PMD in accordance with the determined condition of the individual.

According to additional or alternative embodiments, the controller is configured to pre-torque the PMD in accordance with the determined condition of the individual.

According to additional or alternative embodiments, the controller is configured to modulate an operation of the PMD in accordance with the determined condition of the individual.

According to yet another aspect of the disclosure, a method of operating an intelligent surface system is provided and includes operating personnel movement devices (PMD) to move individuals between respective first and second locations within an enclosure, sensing characteristics of the individuals, determining a condition of each of the individuals based on the characteristics and controlling respective operations of the PMDs in accordance with the determined conditions of each of the individuals.

According to additional or alternative embodiments, the controlling includes at least one or more of expediting or disabling the PMD in accordance with the determined condition of the individual, pre-torqueing the PMD in accordance with the determined condition of the individual and modulating an operation of the PMD in accordance with the determined condition of the individual.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

As will be described below, integrated pressure sensors are deployed in a system within a building or enclosure to predict system level user impact. The pressure sensors do not require conscious user-system interaction and collect user behavior data autonomously and seamlessly. This data may be further processed by suitable algorithms affording more efficient and robust system performance. The pressure sensors may be grouped into mats that are capable of 3D data collection (X, Y, pressure) with multi touch detection capabilities yielding object tracking (i.e., location, speed, direction, intent), object detection (i.e., wheelchairs, elderly, children, pets, luggage, trolley, etc.) and object property determination (i.e., mass, volume, motion, etc.). The pressure sensors may be located near elevator and escalator human machine interfaces (HMIs) and may be disposed as components of lobby floors near kiosks/hoistway doors/escalators, for example. Alternatively, the pressure sensors may be integrated into handrails, handles and door panel surfaces to allow for seamless data collection.

Figure 1:
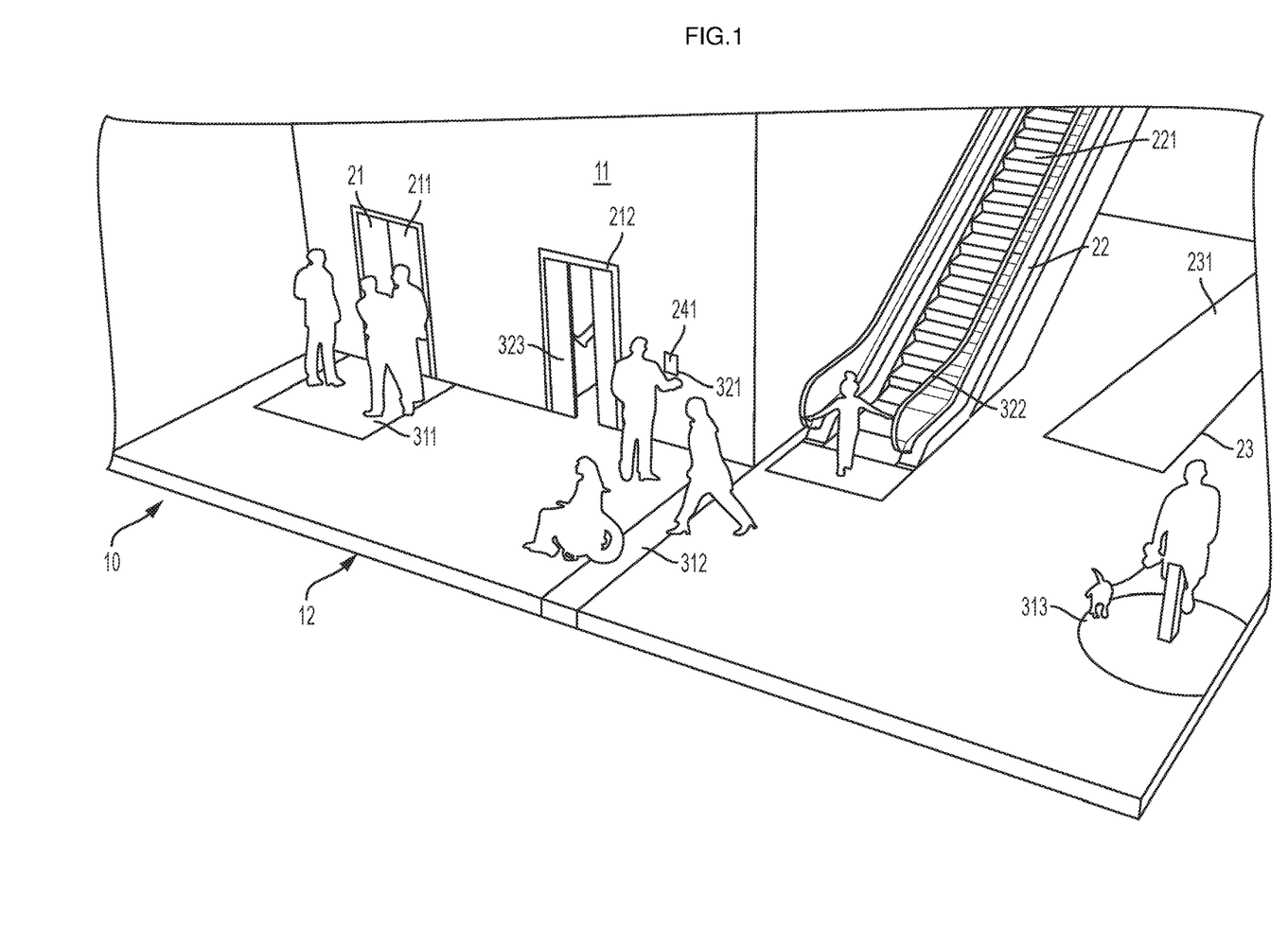
FIG. 1 is a perspective view of an intelligent surface system deployed in accordance with embodiments.
Figure 2:
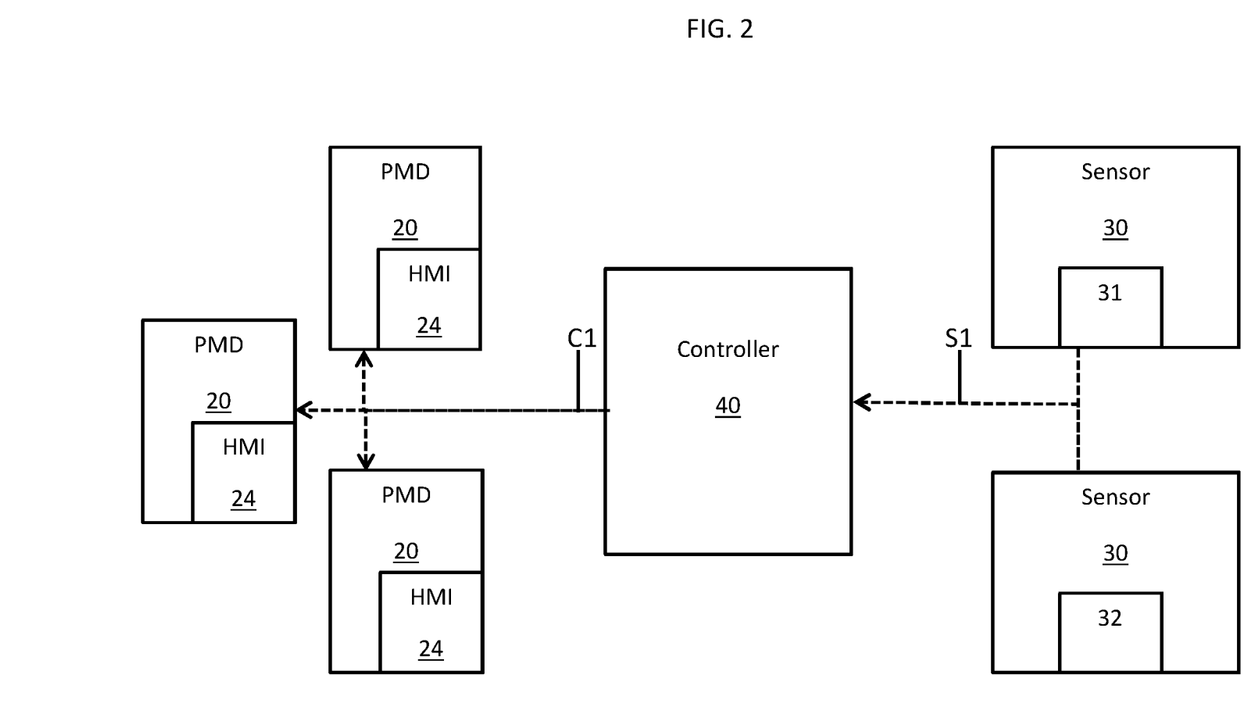
FIG. 2 is a schematic diagram illustrating an operation of a controller of the intelligent surface system of FIG. 1.

With reference to FIGS. 1 and 2, an intelligent surface system 10 is provided for deployment within a space 11 defined inside an enclosure 12. The enclosure 12 can be any residential, commercial or mixed use building or an exterior region enclosed by defined property boundaries. In any case, the intelligent surface system 10 further includes personnel movement devices (PMDs) 20, sensors 30 and a controller 40 (see FIG. 2).

The PMDs 20 are configured to move individuals between respective first and second locations within the enclosure 12 and may include or be provided as at least one or more elevators 21, at least one or more escalators 22, at least one or more moving walkways 23 or other similar devices. In one embodiment, the PMDs 20 may be exterior to the enclosure 12 but within defined property boundaries and/or may move individuals from the exterior of the enclosure 12 to the space 11. The PMDs 20 may further include human machine interfaces (HMIs) 24 for each of the one or more elevators 21, each of the one or more escalators 22 and possibly each of the one or more moving walkways 23. Each HMI 24 is configured to control the corresponding elevator 21, escalator 22 or moving walkway 23. In one embodiment, an HMI 24 may control all or a subset of the PMDs 20 within the enclosure and the exterior region enclosed by defined property boundaries. The sensors 30 are deployed within the enclosure 12 to sense characteristics of the individuals before and during the movements of the individuals by the PMDs 20.

As shown in FIG. 1, the exemplary enclosure 12 includes dual elevators 211 and 212 with a single HMI 241, a single escalator 221 with an HMI that is not shown and a single moving walkway 231. The following description will therefore relate to this case for purposes of clarity and brevity but it will be understood that other configurations of PMDs 20 are possible.

The sensors 30 may be provided as one or more mat sensors 31 and one or more touch sensitive sensors 32. In accordance with exemplary embodiments and, as shown in FIG. 1, the one or more mat sensors 31 may be provided as first mat sensor 311 proximate to elevator 211, second mat sensor 312 that is disposed to extend across the walkway leading to elevators 211 and 212 and third mat sensor 313 disposed as an island within a main walkway. The one or more touch sensitive sensors 32 may be provided as elevator control panels 321, handles/handrails 322 (hereinafter referred to as "handrails 322") and door panel integrated sensors 323. As above, the following description will relate to this case for purposes of clarity and brevity but it will be understood that other configurations of sensors 30 are possible.

As shown in FIG. 2, the controller 40 is coupled to the PMDs 20 (i.e., elevators 211 and 212 and escalator 221) and the sensors 30 and is capable of issuing control commands C1 to the PMDs 20 and is receptive of sensor reading signals S1 from the sensors 30. While FIG. 2 only depicts three PMDs 20 and two sensors 30, it should be understood that any number of PMDs 20 and sensors 30 may be used. The controller 40 is thus configured to determine a condition of each of the individuals based on the characteristics of those individuals that are sensed by the sensors 30 and to control respective operations of the PMDs 20 by way of the control commands C1 in accordance with the determined conditions of each of the individuals.

In accordance with embodiments, the characteristics of each of the individuals may include at least one or more of object tracking characteristics, object detection characteristics and object property characteristics. As used herein, the object tracking characteristics relate to location, speed, direction and intent of an object or individual and, for a given individual, can be determined, for example, by monitoring a vector and velocity of that individual as he/she crosses over the one or more mat sensors 31. As used herein, the object detection characteristics relate to a type of an object or individual and can be determined, for example, by sensing a shape and weight of an object or individual positioned on the one or more mat sensors 31. As used herein, the object property determination characteristics relate to a mass, a volume and a type of an object or individual and can be determined, for example, by sensing small and/or repeated movements of the object or individual relative to the one or more mat sensors 31.

Figure 3:
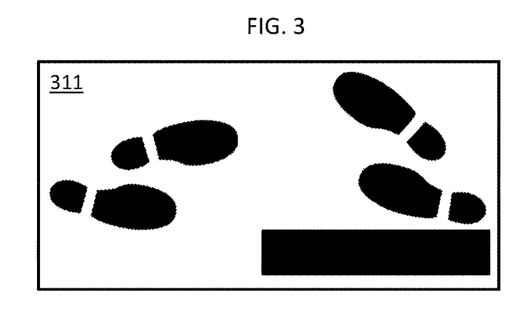
FIG. 3 is a top-down view of a mat sensor proximate to a personnel movement device (PMD) of the intelligent surface system of FIG. 1.

With reference to FIG. 3, the first mat sensor 311 is proximate to elevator 211 and is configured to sense various characteristics of personnel who are about to enter the elevator 211. For example, the first mat sensor 311 may be provided as a scale or pressure sensor with an optical sensing capability. As such, the first mat sensor 311 may be able to sense pressure caused by two pairs of footprint-shaped bodies as well as a single rectangular-shaped body proximate to one of the two pairs of the footprint-shaped bodies due to its scale/pressure sensor and may be able to identify the shapes of the footprints and the rectangular-shaped body due to its optical sensing. The scale/pressure sensor of the first mat sensor 311 may further sense that one pair of footprint-shaped bodies is relatively static while the other pair of footprint-shaped bodies is moving frequently.

With the first mat sensor 311 sensing such characteristics, the controller 40 is receptive of data from the first mat sensor 311 as sensor reading signal S1 and is thereby configured to determine a condition of the personnel about to enter the elevator 211. That is, in the instance of FIG. 3, the controller 40 may determine that there are two people waiting to board the elevator 211 and that each person has a similar weight from the respective pressures. Moreover, the controller 40 may be further configured to ascertain that at least one of the personnel is holding a briefcase of a certain weight which has been laid on the ground next to his pair of footprints. In addition, the controller 40 may be configured to determine that the person whose footprints are moving rapidly is stressed or rushed and thus impatient.

With the controller 40 determining that the personnel include two people of a certain weight with at least one briefcase and that at least one person is stressed or rushed from the rapidly moving footprints, the controller 40 can issue control commands C1 to the elevator 211 such that the elevator 211 is pre-torqued to handle the combined weight of the personnel and the briefcase and such that the elevator 211 is expedited to address the needs of the stressed or rushed person.

Figure 4:
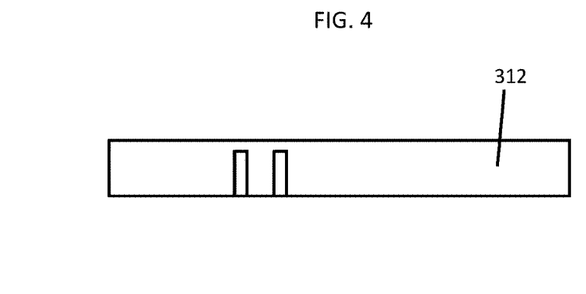
FIG. 4 is a top-down view of a mat sensor in a walkway of the intelligent surface system of FIG. 1.
Figure 5:
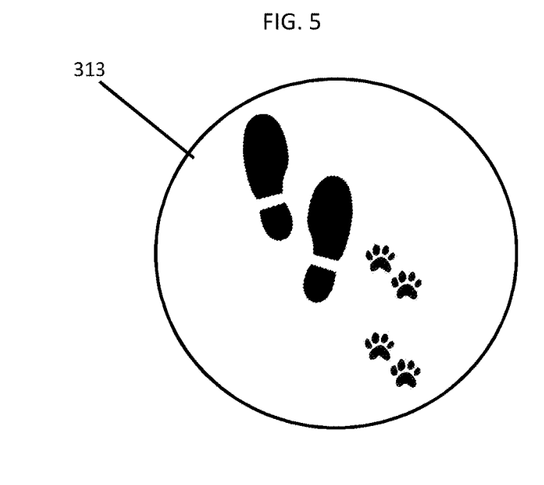
FIG. 5 is a top-down view of a mat sensor provided as an island of the intelligent surface system of FIG. 1.

With reference to FIGS. 4 and 5, the second and third mat sensors 312 and 313 are respectively disposed to extend across the walkway leading to the elevators 211 and 212 and provided as an island in a main walkway. The second and third mat sensors 312 and 313 are configured to sense various characteristics of personnel who are about to proceed toward the elevators 211 and 212 and who are simply walking along the main walkway. For example, like the first mat sensor 311, the second and third mat sensors 312 and 313 may each be provided as a scale/pressure sensor and may also have optical sensing capabilities. As such, the second mat sensor 312 may sense pressure caused by wheelchair wheels traversing the width of the second mat sensor 312 and may be able to ascertain due to its optical sensing capabilities the shape of the points contacting the second mat sensor 312 such that the contacting points can be identified as those of wheelchair wheels. The third mat sensor 313 may sense numbers of people and pets in the main walkway by way of similar pressure and optical sensing.

With the second and third mat sensors 312 and 313 sensing such characteristics, the controller 40 is receptive of data from the second and third mat sensors 312 and 313 as sensor reading signals S1. The controller 40 is configured to determine vectors and velocities of sensed objects/individuals from data S1 and provides a condition of the objects/individuals that are about to proceed toward the elevators 211 and 212 and of the objects/individuals in the main walkway. That is, in the instances of FIGS. 4 and 5, the controller 40 may determine that there is a single person riding in a wheelchair who is moving toward the elevators 211 and 212 from the shape of the imprint of the wheelchair wheels being applied to the surface of the second mat sensor 312 and that a single person is in the main walkway with a pet from the shapes and types of the human and canine footprints being applied to the surface of the third mat sensor 313. Moreover, the controller 40 may be further configured to ascertain a speed of such movement of the wheelchair-bound person as well as a speed and direction of the person walking with her dog by, once again, sensing pressures applied by their respective vectors and velocities as well as certain identifiable features of the person and her dog (e.g., type of shoes the person owns, dog breed, etc.) by optical sensing.

With the controller 40 determining that the single wheelchair-bound person is moving toward the elevators 211 and 212 and the various characteristics of the person and her dog, the controller 40 can issue control commands C1 to the elevator 212 such that the elevator 212 is pre-torqued to handle the combined weight of the person and the wheelchair and such that the elevator 212 is expedited to address the needs of the wheelchair-bound person. The pre-torqueing of the elevator 212 would be executed at the elevator motor (not shown) and serves to prepare the elevator 212 to lift more weight than is usually lifted when a person comes on board. The expediting of the elevator 212 could similarly be executed at the elevator dispatching unit (not shown) whereby standard dispatching commands may be overridden in favor of picking up the wheelchair-bound person. Moreover, the controller 40 can make other similar decisions to account for the person walking her dog. For example, since the person is walking away from any of the PMDs 20, the controller 40 can decide not to make any change to the operations of the PMDs on her account. That is, the controller 40 will not issue control commands leading to pretorqueing or expediting of the elevator 212 on her account.

Figure 6:
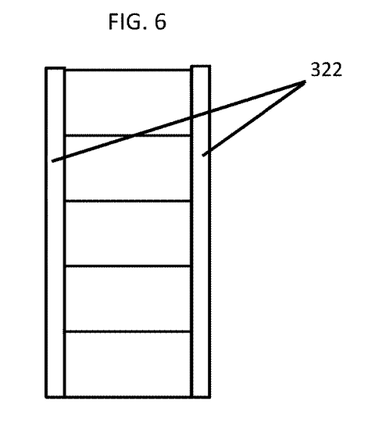
FIG. 6 is a top-down view of handrail sensors of the intelligent surface system of FIG. 1.
Figure 7:
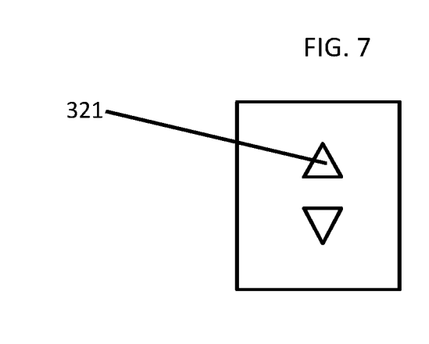
FIG. 7 is a horizontal view of a human machine interface of the intelligent surface system of FIG. 1.
Figure 8:
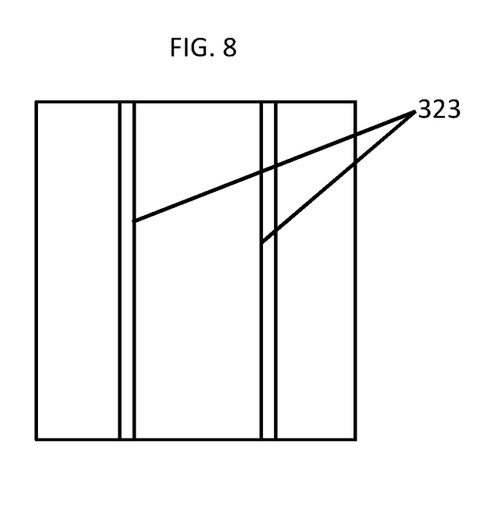
FIG. 8 is a horizontal view of a door sensor of the intelligent surface system of FIG. 1.

With reference to FIGS. 6-8, the one or more touch sensitive sensors 32 may be provided as handrails 322 (see FIG. 6), an elevator control panel 321 (see FIG. 7) and door panel integrated sensors 323 (see FIG. 8).

In the case of the handrails 322 of FIG. 6, the one or more touch sensitive sensors 32 may be configured to read palm prints of people riding the escalator 221 whereby the controller 40 could then determine the number of people on the escalator 221 for expediting, disabling or pre-torqueing purposes. In an embodiment, the handrails 322 could read that a person on the escalator 221 has only a single hand on the handrails 322 and the controller 40 could then determine that he has lost his balance and then accordingly moderate an operation of the escalator 221 to help the person regain his balance all in real-time (e.g., by speeding up or slowing down the escalator 221 as long as no one else was aboard).

In the cases of the elevator control panel 321 of FIG. 7 and the door panel integrated sensors 323 of FIG. 8, the one or more touch sensitive sensors 32 may be configured to read pressures being applied to up/down buttons as in FIG. 7 or pressures being applied to the inside edges of elevator doors as in FIG. 8. In each case, the controller 40 can determine whether a person has repeatedly or strongly pressed one of the up/down buttons to indicate stress or a rush situation and respond accordingly by dispatching an elevator or to determine that a person remains in an elevator doorway and to disable all operations for safety purposes.

In accordance with further aspects, a method of operating an intelligent surface system as described herein is provided. The method includes operating personnel movement devices (PMDs) to move individuals between respective first and second locations within an enclosure, sensing characteristics of the individuals, determining a condition of each of the individuals simultaneously or nearly at a same time based on the characteristics and controlling respective operations of the PMDs in accordance with the determined conditions of each of the individuals.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An intelligent surface system for deployment in a space, the intelligent surface system comprising:
    a personnel movement device (PMD) configured to move an individual between first and second locations;
    sensors deployed to sense characteristics of the individual and comprising mats deployed proximate to the PMD, across a walkway proximate to the PMD or as an island in a walkway proximate to the PMD to sense one or more of small and/or repeated movements, footprint shapes and differences between static and moving footprints; and
    a controller configured to determine a condition of the individual based on the characteristics and control an operation of the PMD in accordance with the determined condition of the individual.

2. The intelligent surface system according to claim 1, wherein the PMD comprises:
    at least one of an elevator, an escalator and a moving walkway; and
    a human machine interface (HMI) configured to control the at least one of the elevator, the escalator and the moving walkway.

3. The intelligent surface system according to claim 1, wherein the sensors further comprise at least one or more of touch sensitive sensors integrated into handrails, handles and door panels to sense one or more of palm prints, manually applied pressure and repetitive pressure applications.

4. The intelligent surface system according to claim 1, wherein the characteristics comprise at least one or more of object tracking characteristics, object detection characteristics and object property determination characteristics.

5. The intelligent surface system according to claim 4, wherein the controller determines at least one or more of:
    a location, a speed, a direction and an intent from the object tracking characteristics,
    a type of an object from the object detection characteristics, and
    a mass, a volume and a type of motion from the object property determination characteristics.

6. The intelligent surface system according to claim 1, wherein the controller is configured to expedite or disable the PMD in accordance with the determined condition of the individual.

7. The intelligent surface system according to claim 1, wherein the controller is configured to pre-torque the PMD in accordance with the determined condition of the individual.

8. The intelligent surface system according to claim 1, wherein the controller is configured to modulate an operation of the PMD in accordance with the determined condition of the individual.

9. An intelligent surface system, comprising:
    an enclosure;
    personnel movement devices (PMDs) configured to move individuals between respective first and second locations within the enclosure;
    sensors deployed within the enclosure to sense characteristics of the individuals and comprising mats deployed proximate to the PMD, across a walkway proximate to the PMD or as an island in a walkway proximate to the PMD to sense one or more of small and/or repeated movements, footprint shapes and differences between static and moving footprints; and
    a controller coupled to the PMD and the sensors, the controller being configured to:
    determine a condition of each of the individuals based on the characteristics, and
    control respective operations of the PMDs in accordance with the determined conditions of each of the individuals.

10. The intelligent surface system according to claim 9, wherein the PMDs comprise:
    at least one or more elevators;
    at least one or more escalators;
    at least one or more moving walkways; and
    human machine interfaces (HMI) for each of the at least one or more elevators, escalators, and moving walkways,
    each HMI being configured to control the corresponding elevator, escalator or moving walkway.

11. The intelligent surface system according to claim 9, wherein the sensors further comprise at least one or more of touch sensitive sensors integrated into handrails, handles and door panels to sense one or more of palm prints, manually applied pressure and repetitive pressure applications.

12. The intelligent surface system according to claim 9, wherein the characteristics comprise at least one or more of object tracking characteristics, object detection characteristics and object property determination characteristics.

13. The intelligent surface system according to claim 12, wherein the controller determines at least one or more of:
    a location, a speed, a direction and an intent from the object tracking characteristics,
    a type of an object from the object detection characteristics, and
    a mass, a volume and a type of motion from the object property determination characteristics.

14. The intelligent surface system according to claim 9, wherein the controller is configured to expedite or disable the PMD in accordance with the determined condition of the individual.

15. The intelligent surface system according to claim 9, wherein the controller is configured to pre-torque the PMD in accordance with the determined condition of the individual.

16. The intelligent surface system according to claim 9, wherein the controller is configured to modulate an operation of the PMD in accordance with the determined condition of the individual.

17. A method of operating an intelligent surface system, the method implemented with a controller functionally coupled to an enclosure, wherein the controller is equipped with circuitry configured to utilize sensed information in regulating operation of one or more personnel movement devices, the method comprising:
- operating, by the controller, the personnel movement devices (PMD) to move individuals between respective first and second locations within the enclosure;
- sensing, by the controller, characteristics of the individuals at: mats deployed proximate to the PMD, across a walkway proximate to the PMD or as an island in a walkway proximate to the PMD to sense one or more of small and/or repeated movements, footprint shapes and differences between static and moving footprints,
- the sensing further operating via touch sensitive sensors integrated into handrails, handles and door panels to enable the controller to sense one or more of palm prints, manually applied pressure and repetitive pressure applications;
- determining, by the controller, a condition of each of the individuals based on the characteristics, and
- controlling, by the controller, respective operations of the PMDs in accordance with the determined conditions of each of the individuals.

18. The method according to claim 17, wherein the controlling comprises at least one or more of:
- expediting or disabling the PMD in accordance with the determined condition of the individual;
- pre-torqueing the PMD in accordance with the determined condition of the individual; and
- modulating an operation of the PMD in accordance with the determined condition of the individual.

\* \* \* \* \*